United States Patent
Mena Benito et al.

(10) Patent No.: US 12,533,077 B2
(45) Date of Patent: Jan. 27, 2026

(54) MEASUREMENT OF BLOOD PRESSURE AND EDEMA, FOR EXAMPLE AS AN INDICATION OF AN INCREASED LIKELIHOOD OF PRE-ECLAMPSIA

(71) Applicant: KONINKLIJKE PHILIPS N.V., Eindhoven (NL)

(72) Inventors: Maria Estrella Mena Benito, Eindhoven (NL); Mark Thomas Johnson, Arendonk (BE); Mohammed Meftah, Tilburg (NL); Hiwale Sujitkumar, Aurangabad (IN)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 478 days.

(21) Appl. No.: 18/031,034

(22) PCT Filed: Oct. 13, 2021

(86) PCT No.: PCT/EP2021/078308
§ 371 (c)(1),
(2) Date: Apr. 10, 2023

(87) PCT Pub. No.: WO2022/079100
PCT Pub. Date: Apr. 21, 2022

(65) Prior Publication Data
US 2023/0371894 A1   Nov. 23, 2023

(30) Foreign Application Priority Data
Oct. 15, 2020   (EP) ..................................... 20202157

(51) Int. Cl.
*A61B 5/00* (2006.01)
*A61B 5/0295* (2006.01)

(52) U.S. Cl.
CPC .......... *A61B 5/4878* (2013.01); *A61B 5/0295* (2013.01); *A61B 5/6826* (2013.01)

(58) Field of Classification Search
CPC ... A61B 5/4878; A61B 5/0295; A61B 5/6826; A61B 5/6898; A61B 5/02225; A61B 5/4343
See application file for complete search history.

(56) References Cited

U.S. PATENT DOCUMENTS

2005/0085742 A1   4/2005  Ueda et al.
2015/0164404 A1*  6/2015  Euliano .............. A61B 5/02416
                                                      600/301
(Continued)

FOREIGN PATENT DOCUMENTS

AU      2020202335 A1   4/2020
EP         3222211 A1   9/2017
(Continued)

OTHER PUBLICATIONS

International Search report and Written Opinion of PCT/EP2021/078308, dated Dec. 21, 2021.

*Primary Examiner* — Eugene T Wu (57) ABSTRACT

A system comprises a first sensor for generating a swelling signal based on the user pressing on the first sensor with a body part, a second sensor for generating a blood signal which is indicative of the volume of blood in the body part when the user presses on the first sensor and a force sensor for measuring the force applied by the body part to the first sensor when the user presses on the first sensor. The system also comprises a processor configured to determine an indication of swelling for the body part based on the swelling signal when the force sensor measures a first pre-determined value, determine an indication of blood pressure at the body part based on a force value measured by (Continued)

the force sensor when the blood signal reaches a second pre-determined value.

12 Claims, 5 Drawing Sheets

(56) References Cited

U.S. PATENT DOCUMENTS

| | | | |
|---|---|---|---|
| 2018/0220961 A1* | 8/2018 | Burns | A61B 5/0537 |
| 2018/0303405 A1 | 10/2018 | Dugan | |
| 2019/0274555 A1 | 9/2019 | Park et al. | |
| 2020/0253536 A1* | 8/2020 | McKinney | A61B 5/6874 |
| 2023/0132131 A1* | 4/2023 | Tuytten | A61B 5/7264 |
| | | | 702/19 |

FOREIGN PATENT DOCUMENTS

| | | |
|---|---|---|
| KR | 20060081166 A | 7/2006 |
| WO | 0230277 A2 | 4/2002 |
| WO | 2019028196 A1 | 2/2019 |
| WO | 2020006518 A1 | 1/2020 |

* cited by examiner

MEASUREMENT OF BLOOD PRESSURE AND EDEMA, FOR EXAMPLE AS AN INDICATION OF AN INCREASED LIKELIHOOD OF PRE-ECLAMPSIA

CROSS-REFERENCE TO PRIOR APPLICATIONS

This application is the U.S. National Phase application under 35 U.S.C. § 371 of International Application No. PCT/EP2021/078308, filed on Oct. 13, 2021, which claims the benefit of European Patent Application No. 20202157.2, filed on Oct. 15, 2020. These applications are hereby incorporated by reference herein.

FIELD OF THE INVENTION

The invention relates to systems and methods for measuring blood pressure and edema, for example for determining an indication of an increased likelihood of preeclampsia. In particular, the invention relates to indications of swelling and blood pressure relating to pre-eclampsia.

BACKGROUND OF THE INVENTION

Pre-eclampsia affects 5 to 10% of pregnancies and results in substantial maternal and fetal morbidity and mortality. Pre-eclampsia accounts for at least 200,000 maternal deaths worldwide per year. Pre-eclampsia is a pregnancy complication characterized by high blood pressure (blood pressure≥140 mm Hg (19 KPa) systolic or ≥90 mm Hg (12 KPa) diastolic) and signs of damage to another organ system, most often the liver and kidneys. Other signs and symptoms of pre-eclampsia may include: Excess protein in urine (proteinuria), severe headaches, blurred vision, nausea, decreased urine output, and shortness of breath (caused by fluid in the lungs), rapid weight gain and swelling (edema) particularly in face and hands. Edema is one of the symptoms of the onset of pre-eclampsia. Edema, which is an abnormal accumulation of fluid in the interstitium, causes swelling of, for example, the fingers and reduces the mobility and grip of the hand.

Preeclampsia usually begins after 20 weeks of pregnancy in women whose blood pressure had been normal. Diagnosis of pre-eclampsia is generally done during the routine prenatal visits. Cases of undiagnosed pre-eclampsia can occur. Additionally, high blood pressure may develop slowly, or it may have a sudden onset.

Some women can have the disease for weeks before having symptoms, whereas other women can progress to a dangerous level within days. When a pregnant woman does not recognize the symptoms, it can lead to more severe outcomes if the condition stays untreated. The more severe the pre-eclampsia, the greater the risks for the pregnant woman and her baby. From the above, it follows that an awareness and recognition of the warning signs on a daily basis could provide a timely diagnosis of pre-eclampsia during pregnancy.

Pre-eclampsia is usually diagnosed by healthcare professionals during routine prenatal checks. Currently, pre-eclampsia is usually diagnosed too late due to the fact that checks are not performed often enough. Furthermore, pre-eclampsia is a dynamic disease that progresses at different rates in different women. Hence, pre-eclampsia often stays unnoticed until the next check-up, or worse, until more serious symptoms such as seizures appear. However, increasing the routine checks is too expenses and creates pressure on the health system.

Thus, there is a need for a solution which can help women detect early signs of pre-eclampsia and thus seek professional help early.

WO 2020/006518 discloses a device for measuring blood pressure, for example from a user's finger. The device comprises a touch sensitive screen. A blood pressure measurement is obtained by detecting the pressure applied by the finger as well as from blood volume oscillation from a PPG sensor.

SUMMARY OF THE INVENTION

The invention is defined by the claims.

According to examples in accordance with an aspect of the invention, there is provided a system comprising:
  a first sensor for generating a swelling signal based on the user pressing on the first sensor with a body part;
  a second sensor for generating a blood signal relating to the volume of blood in the body part when the user presses on the first sensor;
  a force sensor for measuring the force applied by the body part to the first sensor when the user presses on the first sensor; and
  a processor configured to:
    determine an indication of swelling for the body part based on the swelling signal when the force sensor measures a first pre-determined value; and
    determine an indication of blood pressure at the body part based on a force value measured by the force sensor when the blood signal reaches a second predetermined value.

This system is able to monitor blood pressure and swelling with a single sensor device. The processor is also configured to determine an indication of an increased likelihood of pre-eclampsia from the indications of swelling and blood pressure.

Two main symptoms of pre-eclampsia are high blood pressure and edema (i.e. swelling). It is not possible to diagnose pre-eclampsia with only an indication of both of these symptoms, but they do indicate that the user should seek medical help. This greatly improves the chances of the user getting diagnosed early without the user having unnecessary and costly medical visits.

The indication of blood pressure is determined by measuring the force from the user onto the device (with the force sensor of the device) when the blood signal (from the second sensor) reaches a second pre-determined value. For example, the blood signal may indicate the amount of blood volume flow through the body part. When the blood flow reaches zero, it means the force applied by the user is enough to counter the blood pressure and thus stop the flow of blood. Thus, the force at which this occurs is a useful indication of blood pressure.

The indication of swelling is determined by measuring the swelling signal (from the first sensor) when the force applied by the user reaches a first pre-determined value. The first pre-determined value for the force is arbitrary, however, it ensures that the measure of swelling is done at a known, constant value of force. For example, the swelling signal could indicate the area of the body part in contact with the first sensor.

The invention thus provides a device which is easy to use, low cost, unobtrusive and can be integrated in the daily routine of a pregnant woman. For example screening could take place during teeth brushing, weighing, using a smartphone, etc. Additionally, the device does not require two separate procedures for the measurement of blood pressure and swelling and only requires a single action (pressing once), thus reducing the time and effort required by the user. This reduction in time and effort for the user increases the likelihood of regular use of the device.

The invention also provides a device which can be used to give an indication of other pathologies which affect the user's blood pressure and may (or may not) cause swelling. For example, an indication of low blood pressure and swelling may suggest heart failure and an indication of normal blood pressure and swelling may suggest local pathologies (vein thrombosis, lymph edema etc.). An indication of high/low blood pressure with no swelling may also indicate other possible pathologies.

The first sensor may comprise a waveguide (e.g. with a first side and a second side), a light source for coupling light into the waveguide (e.g. at the first side) and a photodetector for detecting the light from the light source coupled out from the waveguide (e.g. at the second side), wherein the swelling signal is based on the light detected by the photodetector. Thus, in this example, the swelling is used to influence the light path in an optical sensing system.

The light present in the waveguide varies based on the contact area of the body part on the waveguide due to the difference in refraction index between the skin of the body and air. The light in the waveguide is coupled out due to the skin of the body part, thus, the larger the contact are of the body part, the more light in the waveguide which will be coupled out. The photodetector can then measure how much light has been coupled out (before the light reaches the photodetector).

The first sensor may comprise an imaging device for imaging the body part when the user presses on the imaging device, wherein the swelling signal is based on images of the body part. Thus, in this example, image analysis is used to determine the swelling.

The first sensor may comprise an array of electrodes, wherein each electrode is configured to detect whether the body part is in contact with the electrode when the user presses on the array of electrodes and wherein the swelling signal is based on the electrodes of the array of electrodes which are in contact with the body part and/or the electrodes which are not in contact with the body part. Thus, in this example, contact analysis (or lack thereof) is used to determine the swelling.

An example of such array of electrodes includes capacitive fingerprint sensors such as the ones used in some smart phones/tablets. The swelling signal could indicate the area of the body part in contact with the first sensor. Alternatively, the swelling signal could indicate the pattern of peaks and troughs in the fingerprint (or other skin patterns). The fingerprint pattern would stay constant but, if the finger started swelling, the distance between the peaks and troughs would change.

The second sensor may be a photoplethysmography, PPG, sensor for detecting changes in blood volume in the body part when the user presses on the first sensor.

A PPG sensor illuminates the skin and measures changes in light absorption. Light absorption will change depending on the volume of blood underneath the skin, thus changes in blood volume can be measured. The PPG sensor may be implemented by a pulse oximeter. The PPG sensor may also be configured to measure the heartrate of the user.

The processor may be configured to determine an increased likelihood of preeclampsia based on the indication of swelling being higher than a historic indication of swelling and the indication of blood pressure being higher than a historic indication of blood pressure. The indication of an increased likelihood of pre-eclampsia may be based on the indication of swelling being higher than a historic indication of swelling or a swelling threshold value and the indication of blood pressure being higher than a historic indication of blood pressure or a blood pressure threshold value.

The first sensor, second sensor, force sensor and processor may be part of a handheld or wearable device. Alternatively, the first sensor, second sensor and force sensor may be part of a handheld or wearable device, and the processor may be part of a remote device, wherein the handheld or wearable device comprises a first data communications system and the remote device comprises a second data communications system for communicating data to the first data communications system of the handheld or wearable device.

The system of the invention may be used to implement a method comprising:
generating a swelling signal based on the user pressing on a first sensor with a body part;
generating a blood signal relating to volume of blood in the body part when the user presses on the first sensor;
measuring the force applied by the body part to the first sensor when the user presses on the first sensor;
determining an indication of swelling for the body part based on the swelling signal when the force sensor measures a first pre-determined value; and
determining an indication of blood pressure at the body part based on a force value measured by the force sensor when the blood signal reaches a second pre-determined value.

The method further comprises determining an indication of an increased likelihood of pre-eclampsia based on the indication of swelling and the indication of blood pressure. The indication of an increased likelihood of pre-eclampsia is not a diagnosis, but is an indication of the need for a diagnosis. Thus, it is an indication of medical interest but not a diagnosis.

Generating the swelling signal may comprise:
monitoring light coupled out from a waveguide when the body part is pressing on the waveguide; or
imaging the body part when the user presses on an imaging device; or
sensing contact of the body part with an array of electrodes when the user presses on the array of electrodes.

Generating a blood signal may be based on detecting changes in blood volume in the body part when the user presses on the first sensor.

An indication of an increased likelihood of pre-eclampsia may for example be based on the indication of swelling being higher than a historic indication of swelling and the indication of blood pressure being higher than a historic indication of blood pressure.

The invention also provides a computer program product comprising computer program code means which, when executed on a computing device having a processing system, cause the processing system to perform all of the steps of the method as mentioned above.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a system having a first sensor for generating a swelling signal based on the user pressing on the first sensor with a body part, a second sensor for generating a blood signal which is indicative of the volume of blood in the body part when the user presses on the first sensor and a force sensor for measuring the force applied by the body part to the first sensor when the user presses on the first sensor. The system also comprises a processor configured to determine an indication of swelling for the body part based on the swelling signal when the force sensor measures a first pre-determined value, determine an indication of blood pressure at the body part based on a force value measured by the force sensor when the blood signal reaches a second pre-determined value. An indication of an increased likelihood of pre-eclampsia may then be based on the indication of swelling and the indication of blood pressure.

The detection of two symptoms, high blood pressure and edema (i.e. swelling), can greatly aid in the early prediction of pre-eclampsia. The system of the invention is able simultaneously assess (changes in) the blood pressure and the swelling of a body part, such as a finger.

Figure 1:
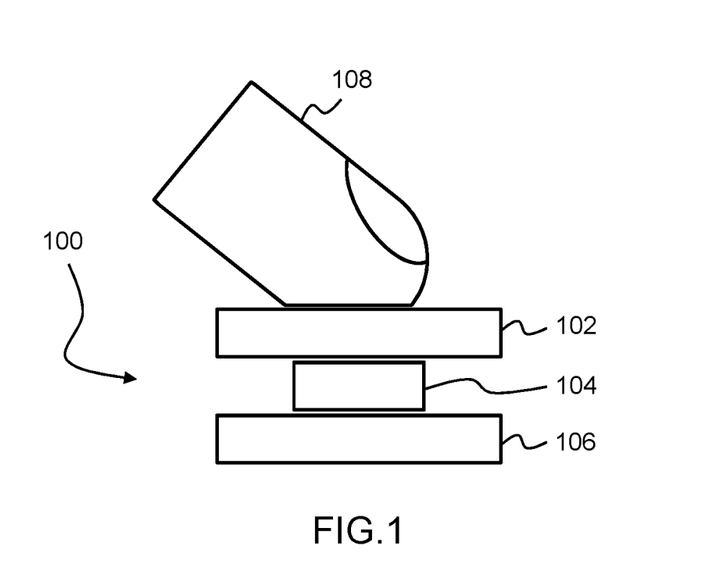
FIG. 1 shows an illustration of the system with a body part of the user.
Figure 2:
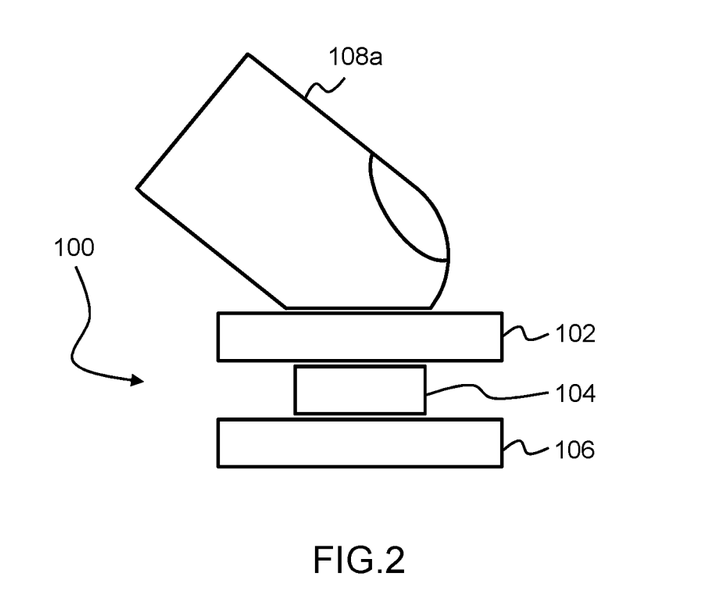
FIG. 2 shows an illustration of the system with a swollen body part of the user.

FIG. 1 shows an illustration of the system 100 with a body part 108 of the user, in particular a finger in this example. FIG. 2 shows an illustration of the system 100 with a swollen body part 108*a* of the user. The processor of the system 100 is not shown in FIG. 1 or 2.

A first sensor 102 and a force sensor 106 are used to determine an indication of swelling for the body part 108. The system 100 also comprises a second sensor 104 that, in combination with the force sensor 106, provide a proxy measurement of blood pressure (i.e. an indication of blood pressure).

It is known that when pressure is applied to the skin, the skin becomes less red. This is because the pressure removes perfusion blood from the sub-surface region. As a consequence of this, if an indication of the blood volume is measured, the indication will decrease as the blood is forced away. For example, if an optical heart rate detection, photoplethysmography (PPG), is being carried out, the PPG signal will disappear as the blood is forced away.

The force required for a PPG signal to disappear scales with the blood pressure in that body part 108. It is clear that the force applied to the skin needs to work against the blood pressure to remove the blood, hence requiring a higher pressure to remove the blood in people with a higher blood pressure.

The second sensor 104 is configured to generate a blood signal which gives an indication of the volume of blood in a particular body part 108. The blood signal is indicative of the blood volume. The second sensor for example may be a PPG sensor such that the blood signal is a PPG signal. Alternatively, the second sensor 104 may comprise an optical sensor to measure the color of the skin on the body part 108 in order to derive the blood signal. The color of the skin as seen from the outside will change in dependence on the volume of blood in the body part.

The first sensor 102 assesses the area of the body part 108 as it pushes on the first sensor 102 when the pressing is at a known force. The principle of determining the degree of swelling of the body part 108, in this case a finger, can be seen between FIG. 1 and FIG. 2.

FIG. 2 shows a swollen finger 108*a* relative to FIG. 1. The contact area between the swollen finger 108*a* and the first sensor 102 is larger for the swollen finger 108*a* in FIG. 2 than the contact area between the non-swollen finger 108 and the first sensor 102 in FIG. 1.

If the finger 108 is not swollen (FIG. 1) the area of the finger 108 at a force F1 is given by area A1. However if the finger 108*a* is swollen (FIG. 2) the same force F1 will result in a larger contact area A2 on the first sensor 102. The degree of swelling can therefore be derived from the increase in the contact area at a given contact force.

In this example, and in future examples, a finger 108 is shown to illustrate and describe the invention. However, a finger 108 is not the only body part that can be used on the system 100. The invention requires indications of blood pressure and of swelling which can be obtained from any body part 108 of a user (e.g. toes) and the system 100 can be designed/manufactured for different body parts 108.

Figure 3:
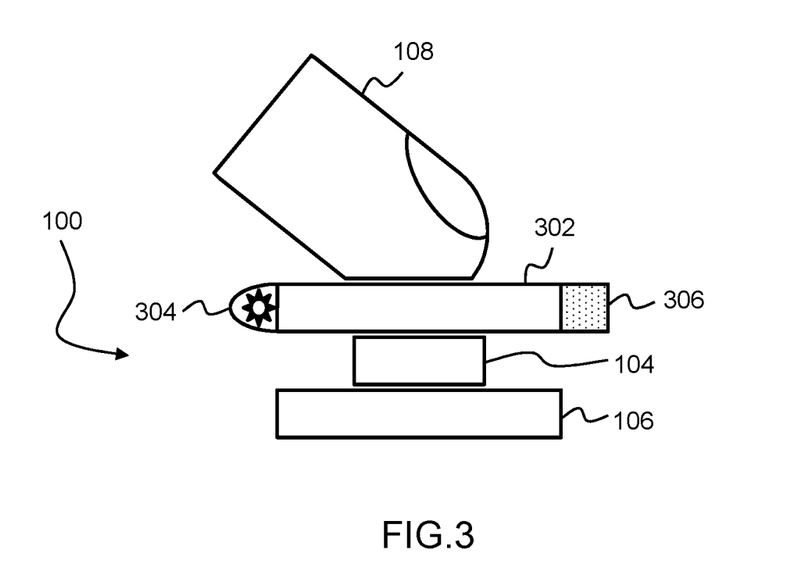
FIG. 3 shows a system where the first sensor comprises a waveguide, a light source and a photodetector.
Figure 4:
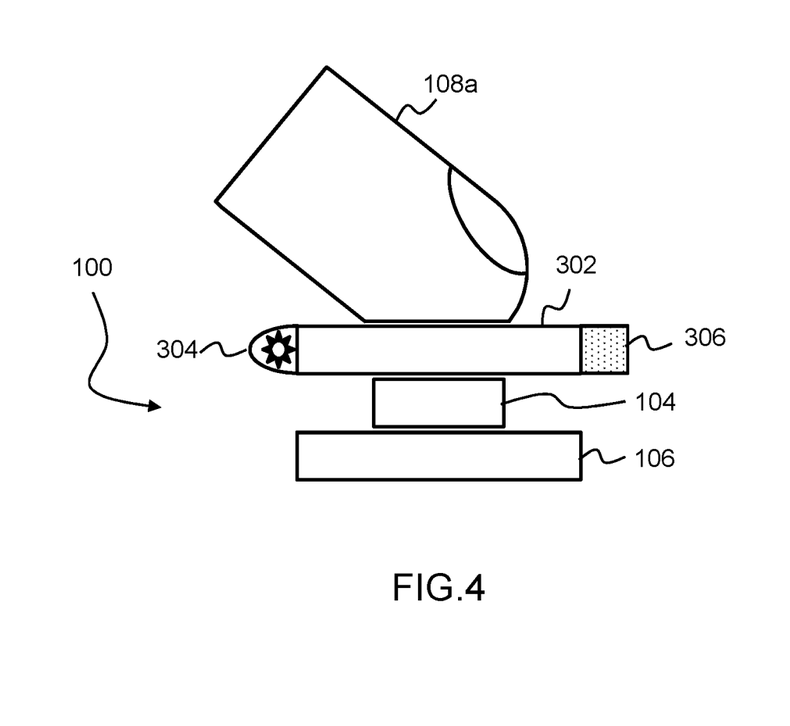
FIG. 4 shows a system where the first sensor comprises a waveguide, a light source and a photodetector and wherein the body part is a swollen finger.

FIG. 3 shows a system 100 where the first sensor 102 comprises a waveguide 302, a light source 304 and a photodetector 306. FIG. 4 shows a system 100 where the first sensor 102 comprises a waveguide 302, a light source 304 and a photodetector 306 and where the body part is a swollen finger 108*a*. The processor is not shown in FIG. 3 or 4.

In this example, the first sensor has a waveguide 302, a light source 304 and a light detector 306 (i.e. a photodetector) to measure the area of the finger 108 in contact with the waveguide 302 at a given pressure. On one side of the waveguide 302, the light source 304 (such as a LED) is configured to inject light into the waveguide 302. At the other side of the waveguide 302 a photodetector 306 (such as a photodiode) is attached and measures the light that emerges from the waveguide 302.

When a finger 108 is pressed onto the waveguide 302 a certain amount of the light will be coupled out of the waveguide 302 as the finger 108 has a higher index of refraction than the air. As a consequence, the amount of light reaching the photodetector 306 will be reduced. The larger the contact area, the more light will be coupled out of the waveguide 302 and thus the signal from the photodetector 306 will decrease accordingly.

In this example, the light source 304 and photodetector 306 are depicted as being opposite each other. However, this is not required as the photodetector 306 can measure the light present in the waveguide 302 at any point on the waveguide 302.

FIG. 4 shows that a swollen finger 108a will create a larger contact area with the waveguide 302 when compared to a non-swollen finger 108 (as can be seen in FIG. 3). In FIGS. 3 and 4 the waveguide 302 is transparent and positioned above the second sensor 104.

In the following explanation, the second sensor 104 will be assumed to be a PPG sensor.

The operation of the system 100 with a waveguide 302 works as follows:
 (i) The user presses the finger 108 on the top of the waveguide 302.
 (ii) As the user increases the force, the PPG signal from the PPG sensor 104 starts to decrease.
 (iii) At the same time, the area of the finger 108 contacting the waveguide 302 increases as the tip of the finger 108 flattens. As a consequence the signal from the photodetector 306 starts to decrease.
 (iv) At a specified reference force, the signal of the photodetector 306 is recorded (this signal is an indication of the swelling of the finger 108).
 (v) The user continues to press harder on the waveguide 302.
 (vi) At a certain force, the blood is diffused away from the volume of the finger 108 where the PPG sensor 104 can probe. At this point the PPG signal disappears (goes to zero). The force measured from the force sensor 106 at which the PPG signal disappears is an indication of the blood pressure of the user.
 (vii) Optionally, after both measurements are captured, the system can indicate that the user may remove the finger 108 from the waveguide 302.

In this manner, a quick and easy (for the user) method allows the user to quantify both the indication of swelling and of blood pressure of the user in one simple process (i.e. pressing the body part 108 onto the first sensor 102 with a (steadily) increasing force).

In most cases, any changes in the swelling and/or the blood pressure are tracked to determine any indication/risk or pre-eclampsia. However, in some cases it may be advantageous to know the actual blood pressure or degree of swelling. This can be realized by the use of a conversion method in the form of an algorithm, a look-up-table or similar which converts the measurements to actual blood pressures or degrees of swelling.

Figure 5:
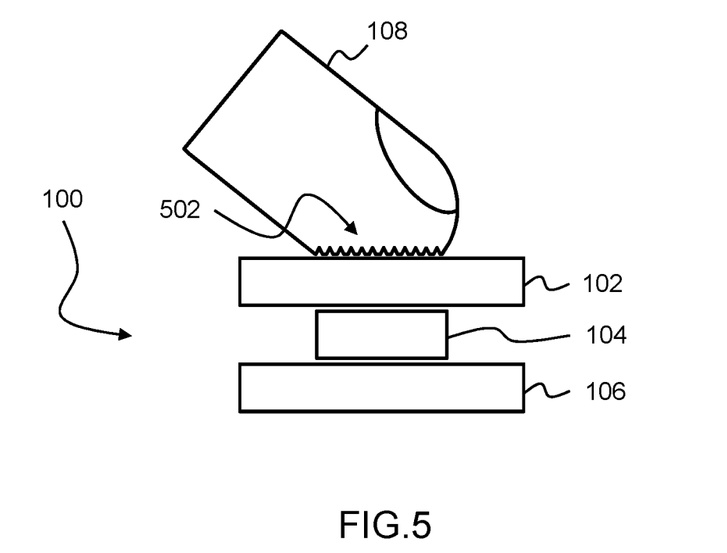
FIG. 5 shows a system where the first sensor is a fingerprint sensor.
Figure 6:
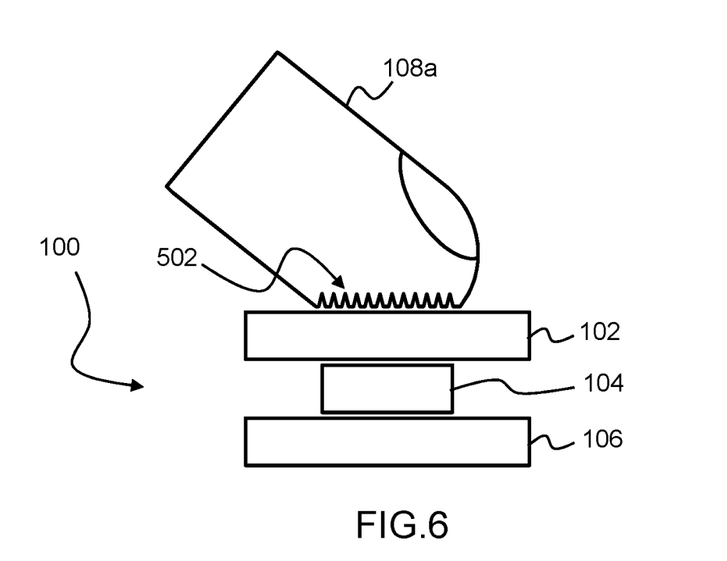
FIG. 6 shows a system where the first sensor is a fingerprint sensor and where the user has a swollen finger.

FIG. 5 shows a system 100 where the first sensor 102 is a fingerprint sensor. FIG. 6 shows a system 100 where the first sensor 102 is a fingerprint sensor and where the user has a swollen finger 108a. The processor is not shown in FIG. 5 or 6.

There are various types of fingerprint sensor 102 (e.g. optical and electrical versions). The optical version uses an array of (CCD) pixels or other photosensitive devices such as photodiodes and optionally some simple imaging optics, such as a microlens array. In most simple versions, the measurement is a contact measurement. In other variants, the image of the fingerprint is projected onto the array of photosensors by the imaging optics.

In an example, the fingerprint sensor 102 is an imaging device, for example, those used to secure and unlock mobile devices. Hence the system 100 will monitor blood pressure and swelling of a finger 108 (or toe). However, the imaging device 102 could be exploited anywhere on the body where a characteristic pattern 502 on the skin (such as ridges, blemishes, hairs, sweat glands etc.) can be determined. This is because, the characteristic pattern 502 of the body part 108 will expand as the body part 108 swells. In this example, only the fingerprint version will be further discussed.

The essence of operation is to determine the distance between the ridges and troughs in the fingerprint pattern 502 when the finger 108 is pressed onto the imaging device 102 at a given pressing force. An increased distance between the characteristic features (i.e. ridges and troughs of fingerprint 502) signifies a swollen finger 108a.

An additional advantage of using a fingerprint sensor 102 is that the fingerprint 502 (or indeed any characteristic pattern of the body) automatically identifies the user of the system 100 and therefore can ensure that the measurements are automatically attributed to the correct user.

Alternatively, the fingerprint sensor 102 could be a capacitive fingerprint sensor. This usually involves an array of electrodes which form capacitors with the finger 108. The measurement is a contact measurement (i.e. the user places their finger 108 onto the fingerprint sensor 102). The fingerprint 502 is detected as the ridges of the fingerprint 502 form a higher capacitance with the array as they are closer to the array, whilst the troughs form a lower capacitance.

Fingerprint sensors 102 (i.e. optical or electrical) can be formed so that they are (partially) transparent, for example, by creating the arrays on a glass substrate and using the same technology (amorphous-Si or poly crystalline-Si transistors) as is used for the substrates of flat panel displays. Alternatively such arrays can be formed on non-transparent substrates such as Si wafers.

Depending upon whether the substrate is transparent or non-transparent, different variants of the device with the first sensor 102 being a fingerprint sensor can be realized. The case of a transparent fingerprint sensor arrangement is shown in FIGS. 5 and 6 positioned above the PPG sensor 104. This construction is further configured so that the contact force can be measured (in this case by supporting the fingerprint sensor 102 and the PPG sensor 104 on a force sensor 106).

The operation of the system 100 with a fingerprint sensor 102 works as follows:
 (i) The user presses the finger 108 on the top of the fingerprint sensor 102.
 (ii) As the user increases the force, the PPG signal starts to decrease.
 (iii) At the same time the area of the finger 108 contacting the fingerprint sensor 102 increases as the tip of the finger 108 flattens.
 (iv) The fingerprint sensor 102 starts to measure a fingerprint pattern 502.
 (v) At a specified reference force, the fingerprint pattern 502 is recorded. The signal containing the pattern (and the distance between ridges and troughs) is an indication of the swelling of the finger.
 (vi) The user continues to press harder onto the fingerprint sensor 102.
 (vii) At a certain force the blood is diffused away from the volume of the finger 108 where the PPG sensor 104 can probe. At this force the PPG signal disappears. Thus, this force is an indication of the blood pressure of the user.

(viii) Optionally, after both measurements are captured, the system 100 can indicate that the user may remove their finger 108.

Figure 7:
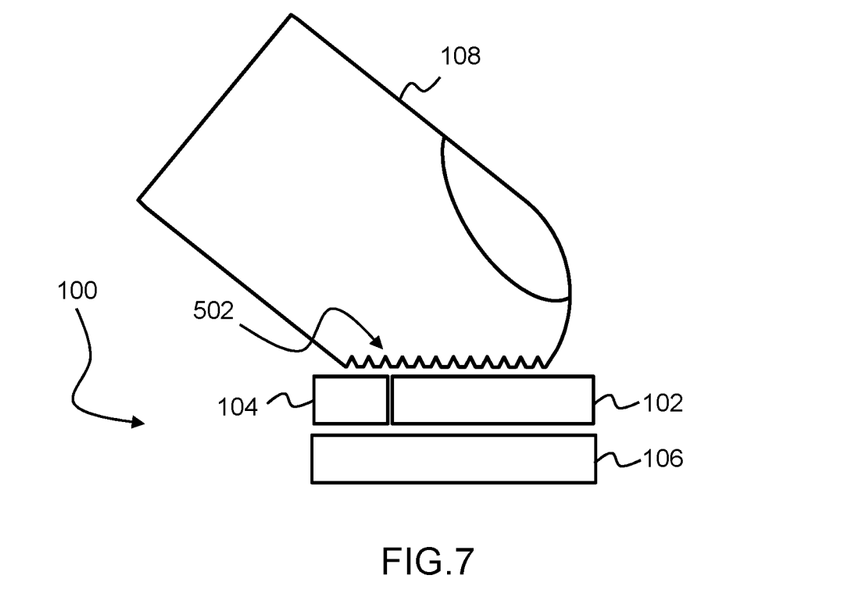
FIG. 7 shows a first example of the system with a non-transparent first sensor.
Figure 8:
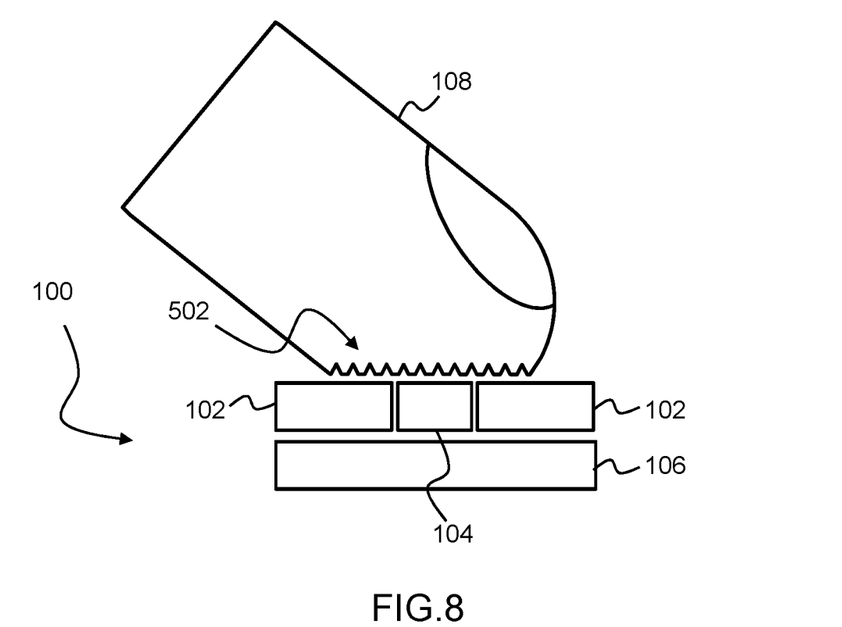
FIG. 8 shows a second example of the system with a non-transparent first sensor.

FIG. 7 shows a first example of the system 100 with a non-transparent first sensor 102. FIG. 8 shows a second example of the system with a non-transparent first sensor 102. The processor is not shown in FIG. 7 or 8.

When the first sensor 102 is a non-transparent, the arrangement of the first sensor 102 and second sensor 104 is different. Two variants of this arrangement can be seen in FIGS. 7 and 8. Due to the first sensor 102 being non-transparent it has to be positioned adjacent to the second sensor 104. In FIG. 7, the second sensor 104 is positioned side-by-side with the first sensor 102. This has the advantage that the first sensor 102 and the second sensor 104 can remain unmodified in the system 100.

In FIG. 8, the second sensor 104 is in the center of the first sensor 102. An opening in the first sensor 102 must be manufactured. This configuration has the advantage of a small form factor (i.e. potentially the same form factor as the existing fingerprint sensors in smart phones and tablet PCs).

For example, the first sensor 102 could a non-transparent fingerprint sensor for determining the characteristic pattern 502 of a body part 108.

Both of these arrangements of sensors are configured so that the contact force can be measured by supporting the structure on a force sensor 106.

The force sensor 106 could measure pressure instead of force. The force can thus be determined from the area of the first sensor 102 and/or the second sensor 104 in contact with the force sensor 106.

The operation of the non-transparent first sensor 102 is identical to that of the transparent first sensor 102.

The system is suitable for incorporation into consumer devices, specifically handheld consumer devices and even more specifically smartphones, tablets and handheld computer devices, laptop mouse, etc. In such consumer devices, the system could be incorporated into a surface the consumer device such as (smart) buttons, fingerprint sensors etc. However it could also be incorporated into other consumer devices such as toothbrushes, shavers, epilators etc.

Figure 9:
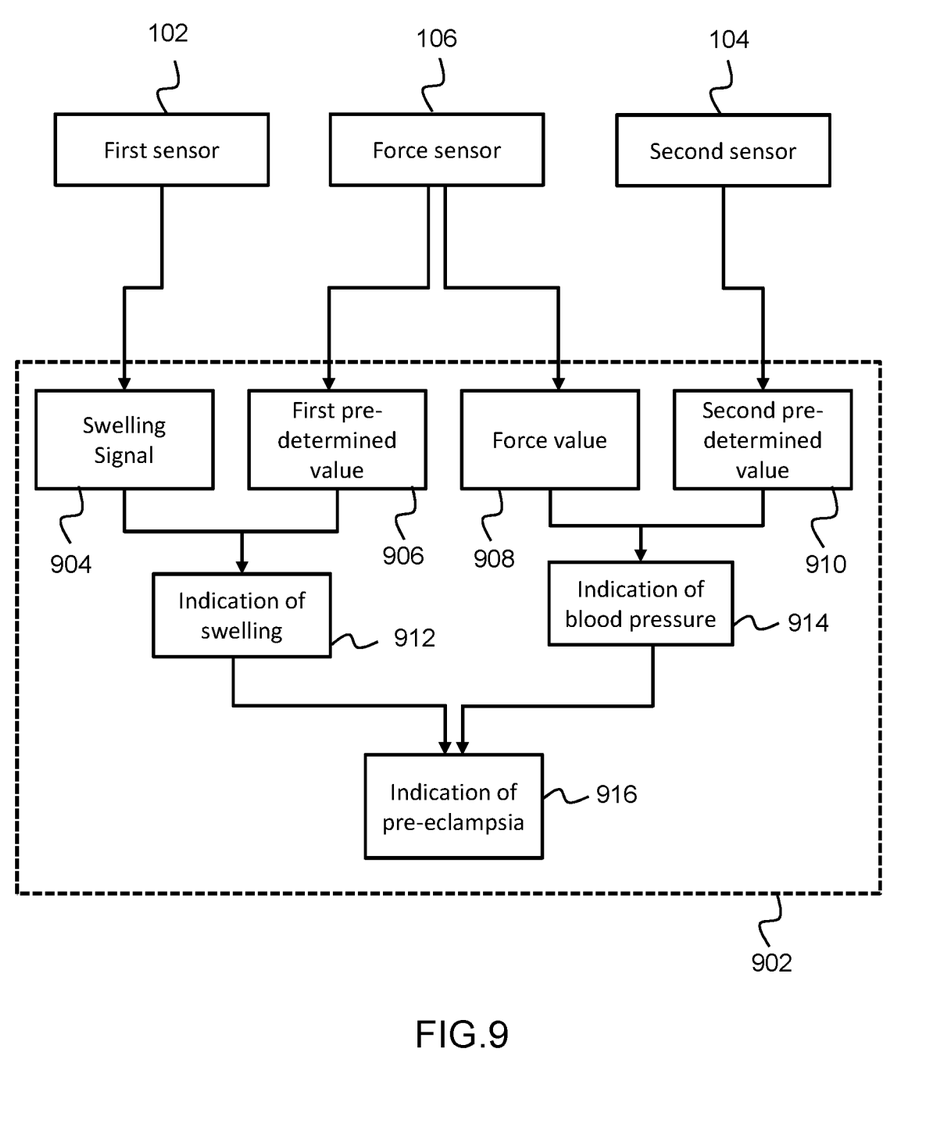
FIG. 9 shows a flow diagram of the data analysis performed by the processor.

FIG. 9 shows a flow diagram of the data analysis performed by the processor 902. The processor 902 determines the indication of swelling 912 and the indication of blood pressure from the signals generated by the first sensor 102, second sensor 104 and force sensor 106. The processor 916 then determines an indication of an increased likelihood of pre-eclampsia 916 for the user based on the indication of swelling 912 and indication of blood pressure 914.

A swelling signal 904 is generated by a first sensor 102 based on the user applying a force to the first sensor 102 with a body part 108. A blood signal is generated by a second sensor 104 based on the volume of blood in the body part 108 when the user applies the force to the first sensor 102. The force applied by the body part 108 to the first sensor 102 is also measured by a force sensor 106.

The processor 902 determines an indication of swelling 912 for the body part 108 based on the swelling signal 904 when the force sensor 106 measures the force to be a first pre-determined value 906. The first pre-determined value 906 for the force will change significantly based on variations between different users. This value 906 could be determined by calibrating the device on first use (i.e. asking the user to press on the first sensor 102 with a "normal force"). Alternatively, the first pre-determined value may be a fixed value (e.g. 2N).

Additionally, the processor 902 determines an indication of blood pressure 914 at the body part 108 based on the force value 908 measured by the force sensor 106 when the blood signal reaches a second pre-determined value 910. For example, if the second sensor 104 is a PPG sensor, then the second pre-determined value 910 could be when the PPG signal reaches zero (or close to zero). Alternatively, the second sensor 104 could be looking at the color of the skin in touch with the first sensor 102 and the second pre-determined value 910 could be a certain color (i.e. less red in skin color due to blood volume reduction).

Blood volume in the body part of the user may be estimated by measuring the time taken for the blood signal to reach the second pre-determined value 910.

Thus, an indication of an increased likelihood of pre-eclampsia 9126 can be determined based on the indication of swelling 912 and the indication of blood pressure 914. For example, the indication of swelling 912 and the indication of blood pressure 914 could both be above respective threshold values. Alternatively, the indication of swelling 912 and/or the indication of blood pressure 914 could have increased (compared to historical values).

The example above demonstrates the particular advantage of obtaining a measure of swelling and blood pressure for detecting a risk of pre-eclampsia. However, the sensor system of the invention may be used in any situation where an assessment of edema and of blood pressure is of interest for a particular user.

For example, an indication of low blood pressure and swelling may indicate the possibility of heart failure for the user, an indication of normal blood pressure and swelling may indicate the possibility of local pathologies (thrombosis, lymph edema etc.) or an indication of high/low blood pressure and no swelling may indicate other pathologies. The processor 902 may contain an algorithm for differentiating between indications of different pathologies based on the indication of blood pressure and the indication of swelling.

As discussed above, the device makes use of processor to perform the data processing. The processor can be implemented in numerous ways, with software and/or hardware, to perform the various functions required. The processor typically employs one or more microprocessors that may be programmed using software (e.g., microcode) to perform the required functions. The processor may be implemented as a combination of dedicated hardware to perform some functions and one or more programmed microprocessors and associated circuitry to perform other functions. The skilled person would be readily capable of developing a processor for carrying out any herein described method.

Examples of circuitry that may be employed in various embodiments of the present disclosure include, but are not limited to, conventional microprocessors, application specific integrated circuits (ASICs), and field-programmable gate arrays (FPGAs).

In various implementations, the processor may be associated with one or more storage media such as volatile and non-volatile computer memory such as RAM, PROM, EPROM, and EEPROM. The storage media may be encoded with one or more programs that, when executed on one or more processors and/or controllers, perform the required functions. Various storage media may be fixed within a processor or controller or may be transportable, such that the one or more programs stored thereon can be loaded into a processor. A single processor or other unit may fulfill the functions of several items recited in the claims.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

If the term "adapted to" is used in the claims or description, it is noted the term "adapted to" is intended to be equivalent to the term "configured to".

Any reference signs in the claims should not be construed as limiting the scope.

The invention claimed is:

1. A system comprising:
    a first sensor for generating a swelling signal based on a user pressing on the first sensor with a body part;
    a second sensor for generating a blood signal relating to the volume of blood in the body part when the user presses on the first sensor;
    a force sensor for measuring the force applied by the body part to the first sensor when the user presses on the first sensor; and
    a processor configured to:
        determine an indication of swelling for the body part based on the swelling signal when the force sensor measures a first pre-determined value;
        determine an indication of blood pressure at the body part based on a force value measured by the force sensor when the blood signal reaches a second pre-determined value; and
        determine an increased likelihood of pre-eclampsia from the indication of swelling and the indication of blood pressure.

2. The system of claim 1, wherein the first sensor comprises:
    a waveguide;
    a light source for transmitting light into the waveguide; and
    a photodetector for detecting the light from the light source coupled out from the waveguide, wherein the swelling signal is based on the light detected by the photodetector.

3. The system of claim 1, wherein the first sensor comprises:
    an imaging device for imaging the body part when the user presses on the imaging device, wherein the swelling signal is based on images of the body part.

4. The system of claim 1, wherein the first sensor comprises an array of electrodes and wherein each electrode is configured to detect whether the body part is in contact with the electrode when the user presses on the array of electrodes, wherein the swelling signal is based on the electrodes of the array of electrodes which are in contact with the body part and/or the electrodes of the array of electrodes which are not in contact with the body part.

5. The system of claim 1, wherein the second sensor is a photoplethysmography, PPG, sensor for detecting changes in blood volume in the body part when the user presses on the first sensor.

6. The system of claim 1, wherein the first sensor is a fingerprint sensor.

7. The system of claim 1, wherein:
    the first sensor, second sensor, force sensor and processor are part of a hand held or wearable device; or
    the first sensor, second sensor and force sensor are part of a hand held or wearable device, and the processor is part of a remote device, wherein the hand held or wearable device comprises a first data communications system and the remote device comprises a second data communications system for communicating data with the first data communications system of the hand held or wearable device.

8. The system of claim 1, wherein the processor is configured to determine the indication of an increased likelihood of pre-eclampsia based on:
    the indication of swelling being higher than a historic indication of swelling or a swelling threshold value; and
    the indication of blood pressure being higher than a historic indication of blood pressure or a blood pressure threshold value.

9. A computer program product comprising computer program code means which, when executed on the processor of the system of claim 1, is adapted to perform a method comprising:
    generating a swelling signal based on the user pressing on a first sensor with a body part;
    generating a blood signal relating to the volume of blood in the body part when the user presses on the first sensor;
    measuring the force applied by the body part to the first sensor when the user presses on the first sensor;
    determining an indication of swelling for the body part based on the swelling signal when the force sensor measures a first pre-determined value;
    determining an indication of blood pressure at the body part based on a force value measured by the force sensor when the blood signal reaches a second pre-determined value; and
    determining an increased likelihood of pre-eclampsia from the indication of swelling and the indication of blood pressure.

10. The computer program product of claim 9, wherein generating the swelling signal comprises:
    monitoring light coupled out from a waveguide when the body part is pressing on the waveguide; or
    imaging the body part when the user presses on an imaging device; or
    sensing contact of the body part with an array of electrodes when the user presses on the array of electrodes.

11. The computer program product of claim 9, wherein generating a blood signal comprising detecting changes in blood volume in the body part when the user presses on the first sensor.

12. The computer program product of claim 9, wherein determining an increased likelihood of pre-eclampsia is based on:
    the indication of swelling being higher than a historic indication of swelling or a swelling threshold value; and the indication of blood pressure being higher than a historic indication of blood pressure or a blood pressure threshold value.

\* \* \* \* \*